US012648001B2

(12) United States Patent
Nhan et al.

(10) Patent No.: US 12,648,001 B2
(45) Date of Patent: Jun. 2, 2026

(54) CLIENT DEVICE OPERATION MODE INDICATION, AND RELATED DEVICES, METHODS AND COMPUTER PROGRAMS

(71) Applicant: Nokia Technologies Oy, Espoo (FI)

(72) Inventors: Nhat-Quang Nhan, Reims (FR); Kari Juhani Hooli, Oulu (FI); Oskari Tervo, Oulu (FI); Amir Mehdi Ahmadian Tehrani, Munich (DE); Marco Maso, Issy les Moulineaux (FR); Karri Markus Ranta-Aho, Espoo (FI); Alessio Marcone, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 358 days.

(21) Appl. No.: 18/343,286

(22) Filed: Jun. 28, 2023

(65) Prior Publication Data

US 2024/0089988 A1 Mar. 14, 2024

(30) Foreign Application Priority Data

Sep. 8, 2022 (FI) ...................................... 20225780

(51) Int. Cl.
H04W 72/232 (2023.01)
H04L 1/00 (2006.01)
(Continued)

(52) U.S. Cl.
CPC ......... H04W 72/232 (2023.01); H04L 1/0025 (2013.01); H04L 1/0015 (2013.01); H04L 5/0092 (2013.01); H04W 72/23 (2023.01)

(58) Field of Classification Search
CPC .. H04W 72/232; H04W 72/23; H04L 5/0092; H04L 1/0025; H04L 1/0015
See application file for complete search history.

(56) References Cited

U.S. PATENT DOCUMENTS

2013/0242824 A1 9/2013 Lee et al.
2020/0154428 A1 5/2020 Takeda et al.
(Continued)

FOREIGN PATENT DOCUMENTS

EP 3621260 A1 3/2020
ES 2902934 T3 * 3/2022 ............ H04W 72/23
(Continued)

OTHER PUBLICATIONS

3GPP TS 38.331 version 17.0.0 Release 17 (May 2022) (Year: 2022).*

(Continued)

*Primary Examiner* — Jae Y Lee
(74) *Attorney, Agent, or Firm* — Carter, DeLuca & Farrell LLP

(57) ABSTRACT

Devices, methods and computer programs for client device operation mode indication are disclosed. A client device obtains a first indication indicating at least a time duration and at least a first period for repeating the time duration. A downlink control information, DCI, received within the indicated time duration includes a second indication indicating a second operation mode of the client device, and the second indication is not included when the DCI is received outside of the indicated time duration. In response to receiving, at the client device, the DCI from a network node device within the indicated time duration, the client device determines the second operation mode of the client device based on the received second indication, and applies the determined second operation mode of the client device.

1 Claim, 4 Drawing Sheets

(51) Int. Cl.
H04L 5/00 (2006.01)
H04W 72/23 (2023.01)

(56) References Cited

U.S. PATENT DOCUMENTS

| | | | |
|---|---|---|---|
| 2020/0389872 A1 | 12/2020 | Osawa et al. | |
| 2023/0389087 A1* | 11/2023 | Taherzadeh Boroujeni | H04W 74/0841 |
| 2024/0356659 A1* | 10/2024 | Olesen | H04W 16/14 |
| 2025/0203619 A1* | 6/2025 | Ma | H04L 27/2646 |
| 2025/0234340 A1* | 7/2025 | Hasegawa | H04L 27/2601 |
| 2025/0261131 A1* | 8/2025 | Liu | H04W 72/1268 |

FOREIGN PATENT DOCUMENTS

| | | |
|---|---|---|
| WO | 2021/059184 A1 | 4/2021 |
| WO | 2021/260660 A1 | 12/2021 |

OTHER PUBLICATIONS

Extended European Search Report received for corresponding European Patent Application No. 23193704.6, dated Feb. 6, 2024, 11 pages.

"Waveform Selection mechanisms for DFTsOFDM", 3GPP TSG RAN WG1 #90bis, R1-1718400, Agenda item: 7.3.2.4, AT&T, Aug. 21-25, 2017, pp. 1-4.

"3rd Generation Partnership Project; Technical Specification Group Radio Access Network; NR; Physical layer procedures for data (Release 17)", 3GPP TS 38.214, V17.2.0, Jun. 2022, pp. 1-228.

"Discussion on approaches and solutions for NR PUSCH coverage enhancement", 3GPP TSG RAN WG1 #103, R1-2008703, Agenda: 8.8.2.1, Nokia, Oct. 26-Nov. 13, 2020, 15 pages.

"Potential coverage enhancement techniques for PUSCH", 3GPP TSG-RAN WG1 Meeting #103e, R1-2008626, Agenda: 8.8.2.1, Qualcomm Incorporated, Oct. 26-Nov. 13, 2020, 13 pages.

"New WI: Further NR coverage enhancements", 3GPP TSG RAN Meeting #94e, RP-213579, Agenda: 8.6.1, China Telecom, Dec. 6-17, 2021, 5 pages.

"Summary on Rel-17 TEIs", 3GPP TSG RAN WG1 #106bis-e, R1-2109722, Agenda: 8.18, NTT Docomo Inc, Oct. 11-19, 2021, pp. 1-101.

Office action received for corresponding Finnish Patent Application No. 20225780, dated Feb. 13, 2023, 13 pages.

"Dynamic switching between DFT-s-OFDM and CP-OFDM", 3GPP TSG RAN WG1 #111, R1-2211597, Agenda: 9.14.3, Nokia, Nov. 14-18, 2022, 16 pages.

\* cited by examiner

210

200

110

100

1

CLIENT DEVICE OPERATION MODE INDICATION, AND RELATED DEVICES, METHODS AND COMPUTER PROGRAMS

RELATED APPLICATION

This application claims priority of Finnish patent application No. 20225780 filed on Sep. 8, 2022, which is incorporated herein by reference in its entirety.

TECHNICAL FIELD

The disclosure relates generally to communications and, more particularly but not exclusively, to a client device operation mode indication, as well as related devices, methods and computer programs.

BACKGROUND

In fifth generation (5G) new radio (NR) wireless networks, modulated symbols and/or reference signals may be converted to an uplink (UL) baseband signal waveform before mixing into a radio frequency (RF) domain and transmitting over an air interface.

Currently, 5G NR supports semi-static configuration of such an uplink baseband signal waveform via radio resource control (RRC).

However, at least in some situations, there may be a need for a more dynamic or time-varying configuration of the uplink baseband signal waveform, e.g., to enhance UL coverage.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a client device comprises at least one processor, and at least one memory storing instructions that, when executed by the at least one processor, cause the client device at least to perform obtaining a first indication indicating at least a time duration and at least a first period for repeating the time duration. A downlink control information, DCI, received within the indicated time duration includes a second indication indicating a second operation mode of the client device, and the second indication is not included when the DCI is received outside of the indicated time duration. In response to receiving the DCI from a network node device within the indicated time duration, the instructions, when executed by the at least one processor, further cause the client device at least to perform determining the second operation mode of the client device based on the received second indication, and applying the determined second operation mode of the client device.

In an example embodiment, alternatively or in addition to the above-described example embodiments, the instructions, when executed by the at least one processor, further cause the client device to perform the obtaining of the first indication by at least one of: receiving the first indication via control signaling, or deriving the first indication from one or more DCI monitoring occasions configured by the network node device.

2

In an example embodiment, alternatively or in addition to the above-described example embodiments, the first indication further indicates a second period for repeating the time duration.

In an example embodiment, alternatively or in addition to the above-described example embodiments, the second period is used when the second operation mode of the client device is indicated, and otherwise the first period is used.

In an example embodiment, alternatively or in addition to the above-described example embodiments, the second period is shorter than the first period.

In an example embodiment, alternatively or in addition to the above-described example embodiments, the first indication further indicates an expiration time at the expiry of which the client device is to apply a first operation mode of the client device after applying the second operation mode of the client device.

In an example embodiment, alternatively or in addition to the above-described example embodiments, the second indication is included in the DCI as an additional field that is only present when the DCI is received within the indicated time duration.

In an example embodiment, alternatively or in addition to the above-described example embodiments, the second indication is included in the DCI as an existing field that the client device is configured to interpret differently within the indicated time duration than outside of the indicated time duration.

In an example embodiment, alternatively or in addition to the above-described example embodiments, a portion of the DCI is included within the indicated time duration and not included outside of the indicated time duration.

In an example embodiment, alternatively or in addition to the above-described example embodiments, the second operation mode of the client device comprises a second waveform of an uplink baseband signal.

An example embodiment of a client device comprises means for performing obtaining a first indication indicating at least a time duration and at least a first period for repeating the time duration. A downlink control information, DCI, received within the indicated time duration includes a second indication indicating a second operation mode of the client device, and the second indication is not included when the DCI is received outside of the indicated time duration. In response to receiving the DCI from a network node device within the indicated time duration, the means are further configured to perform determining the second operation mode of the client device based on the received second indication, and applying the determined second operation mode of the client device.

In an example embodiment, alternatively or in addition to the above-described example embodiments, the means are further configured to perform the obtaining of the first indication by at least one of: causing the client device to receive the first indication via control signaling, or deriving the first indication from one or more DCI monitoring occasions configured by the network node device.

In an example embodiment, alternatively or in addition to the above-described example embodiments, the first indication further indicates a second period for repeating the time duration.

In an example embodiment, alternatively or in addition to the above-described example embodiments, the second period is used when the second operation mode of the client device is indicated, and otherwise the first period is used.

In an example embodiment, alternatively or in addition to the above-described example embodiments, the second period is shorter than the first period.

In an example embodiment, alternatively or in addition to the above-described example embodiments, the first indication further indicates an expiration time at the expiry of which the client device is to apply a first operation mode of the client device after applying the second operation mode of the client device.

In an example embodiment, alternatively or in addition to the above-described example embodiments, the second indication is included in the DCI as an additional field that is only present when the DCI is received within the indicated time duration.

In an example embodiment, alternatively or in addition to the above-described example embodiments, the second indication is included in the DCI as an existing field that the client device is configured to interpret differently within the indicated time duration than outside of the indicated time duration.

In an example embodiment, alternatively or in addition to the above-described example embodiments, a portion of the DCI is included within the indicated time duration and not included outside of the indicated time duration.

In an example embodiment, alternatively or in addition to the above-described example embodiments, the second operation mode of the client device comprises a second waveform of an uplink baseband signal.

An example embodiment of a method comprises obtaining, by a client device, a first indication indicating at least a time duration and at least a first period for repeating the time duration. A downlink control information, DCI, received within the indicated time duration includes a second indication indicating a second operation mode of the client device, and the second indication is not included when the DCI is received outside of the indicated time duration. In response to receiving, at the client device, the DCI from a network node device within the indicated time duration, the method further comprises determining, by the client device, the second operation mode of the client device based on the received second indication, and applying, by the client device, the determined second operation mode of the client device.

In an example embodiment, alternatively or in addition to the above-described example embodiments, the method further comprises performing the obtaining of the first indication by at least one of: receiving the first indication via control signaling, or deriving the first indication from one or more DCI monitoring occasions configured by the network node device.

In an example embodiment, alternatively or in addition to the above-described example embodiments, the first indication further indicates a second period for repeating the time duration.

In an example embodiment, alternatively or in addition to the above-described example embodiments, the second period is used when the second operation mode of the client device is indicated, and otherwise the first period is used.

In an example embodiment, alternatively or in addition to the above-described example embodiments, the second period is shorter than the first period.

In an example embodiment, alternatively or in addition to the above-described example embodiments, the first indication further indicates an expiration time at the expiry of which the client device is to apply a first operation mode of the client device after applying the second operation mode of the client device.

In an example embodiment, alternatively or in addition to the above-described example embodiments, the second indication is included in the DCI as an additional field that is only present when the DCI is received within the indicated time duration.

In an example embodiment, alternatively or in addition to the above-described example embodiments, the second indication is included in the DCI as an existing field that the client device is configured to interpret differently within the indicated time duration than outside of the indicated time duration.

In an example embodiment, alternatively or in addition to the above-described example embodiments, a portion of the DCI is included within the indicated time duration and not included outside of the indicated time duration.

In an example embodiment, alternatively or in addition to the above-described example embodiments, the second operation mode of the client device comprises a second waveform of an uplink baseband signal.

An example embodiment of a computer program comprises instructions for causing a client device to perform at least the following: obtaining a first indication indicating at least a time duration and at least a first period for repeating the time duration, a downlink control information, DCI, received within the indicated time duration including a second indication indicating a second operation mode of the client device, and the second indication not being included when the DCI is received outside of the indicated time duration; and in response to receiving the DCI from a network node device within the indicated time duration, determining the second operation mode of the client device based on the received second indication; and applying the determined second operation mode of the client device.

An example embodiment of a network node device comprises at least one processor, and at least one memory storing instructions that, when executed by the at least one processor, cause the network node device at least to perform determining a second operation mode of a client device to apply. The instructions, when executed by the at least one processor, further cause the network node device at least to perform providing to the client device a first indication indicating at least a time duration and at least a first period for repeating the time duration. A downlink control information, DCI, transmitted within the indicated time duration includes a second indication indicating the second operation mode of the client device, and the second indication is not included when the DCI is transmitted outside of the indicated time duration. The instructions, when executed by the at least one processor, further cause the network node device at least to perform transmitting the DCI to the client device within the indicated time duration.

In an example embodiment, alternatively or in addition to the above-described example embodiments, the instructions, when executed by the at least one processor, further cause the network node device to perform the providing of the first indication to the client device by at least one of: transmitting the first indication to the client device via control signaling, or configuring one or more DCI monitoring occasions.

In an example embodiment, alternatively or in addition to the above-described example embodiments, the first indication further indicates a second period for repeating the time duration.

In an example embodiment, alternatively or in addition to the above-described example embodiments, the second period is used when the second operation mode of the client device is indicated, and otherwise the first period is used.

In an example embodiment, alternatively or in addition to the above-described example embodiments, the second period is shorter than the first period.

In an example embodiment, alternatively or in addition to the above-described example embodiments, the first indication further indicates an expiration time at the expiry of which the client device is to apply a first operation mode of the client device after applying the second operation mode of the client device.

In an example embodiment, alternatively or in addition to the above-described example embodiments, the second indication is included in the DCI as an additional field that is only present when the DCI is transmitted within the indicated time duration.

In an example embodiment, alternatively or in addition to the above-described example embodiments, the second indication is included in the DCI as an existing field that the client device is configured to interpret differently within the indicated time duration than outside of the indicated time duration.

In an example embodiment, alternatively or in addition to the above-described example embodiments, a portion of the DCI is included within the indicated time duration and not included outside of the indicated time duration.

In an example embodiment, alternatively or in addition to the above-described example embodiments, the second operation mode of the client device comprises a second waveform of an uplink baseband signal.

An example embodiment of a network node device comprises means for performing determining a second operation mode of a client device to apply. The means are further configured to perform providing to the client device a first indication indicating at least a time duration and at least a first period for repeating the time duration. A downlink control information, DCI, transmitted within the indicated time duration includes a second indication indicating the second operation mode of the client device, and the second indication is not included when the DCI is transmitted outside of the indicated time duration. The means are further configured to perform causing the network node device to transmit the DCI to the client device within the indicated time duration.

In an example embodiment, alternatively or in addition to the above-described example embodiments, the means are further configured to perform the providing of the first indication to the client device by at least one of: transmitting the first indication to the client device via control signaling, or configuring one or more DCI monitoring occasions.

In an example embodiment, alternatively or in addition to the above-described example embodiments, the first indication further indicates a second period for repeating the time duration.

In an example embodiment, alternatively or in addition to the above-described example embodiments, the second period is used when the second operation mode of the client device is indicated, and otherwise the first period is used.

In an example embodiment, alternatively or in addition to the above-described example embodiments, the second period is shorter than the first period.

In an example embodiment, alternatively or in addition to the above-described example embodiments, the first indication further indicates an expiration time at the expiry of which the client device is to apply a first operation mode of the client device after applying the second operation mode of the client device.

In an example embodiment, alternatively or in addition to the above-described example embodiments, the second indication is included in the DCI as an additional field that is only present when the DCI is transmitted within the indicated time duration.

In an example embodiment, alternatively or in addition to the above-described example embodiments, the second indication is included in the DCI as an existing field that the client device is configured to interpret differently within the indicated time duration than outside of the indicated time duration.

In an example embodiment, alternatively or in addition to the above-described example embodiments, a portion of the DCI is included within the indicated time duration and not included outside of the indicated time duration.

In an example embodiment, alternatively or in addition to the above-described example embodiments, the second operation mode of the client device comprises a second waveform of an uplink baseband signal.

An example embodiment of a method comprises determining, by a network node device, a second operation mode of a client device to apply. The method further comprises providing, by the network node device, to the client device a first indication indicating at least a time duration and at least a first period for repeating the time duration. A downlink control information, DCI, transmitted within the indicated time duration includes a second indication indicating the second operation mode of the client device, and the second indication is not included when the DCI is transmitted outside of the indicated time duration. The method further comprises transmitting the DCI from the network node device to the client device within the indicated time duration.

In an example embodiment, alternatively or in addition to the above-described example embodiments, the method further comprises performing the providing of the first indication to the client device by at least one of: transmitting the first indication to the client device via control signaling, or configuring one or more DCI monitoring occasions.

In an example embodiment, alternatively or in addition to the above-described example embodiments, the first indication further indicates a second period for repeating the time duration.

In an example embodiment, alternatively or in addition to the above-described example embodiments, the second period is used when the second operation mode of the client device is indicated, and otherwise the first period is used.

In an example embodiment, alternatively or in addition to the above-described example embodiments, the second period is shorter than the first period.

In an example embodiment, alternatively or in addition to the above-described example embodiments, the first indication further indicates an expiration time at the expiry of which the client device is to apply a first operation mode of the client device after applying the second operation mode of the client device.

In an example embodiment, alternatively or in addition to the above-described example embodiments, the second indication is included in the DCI as an additional field that is only present when the DCI is transmitted within the indicated time duration.

In an example embodiment, alternatively or in addition to the above-described example embodiments, the second indication is included in the DCI as an existing field that the client device is configured to interpret differently within the indicated time duration than outside of the indicated time duration.

In an example embodiment, alternatively or in addition to the above-described example embodiments, a portion of the DCI is included within the indicated time duration and not included outside of the indicated time duration.

In an example embodiment, alternatively or in addition to the above-described example embodiments, the second operation mode of the client device comprises a second waveform of an uplink baseband signal.

An example embodiment of a computer program comprises instructions for causing a network node device to perform at least the following: determining a second operation mode of a client device to apply; providing to the client device a first indication indicating at least a time duration and at least a first period for repeating the time duration, a downlink control information, DCI, transmitted within the indicated time duration including a second indication indicating the second operation mode of the client device, and the second indication not being included when the DCI is transmitted outside of the indicated time duration; and transmitting the DCI to the client device within the indicated time duration.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
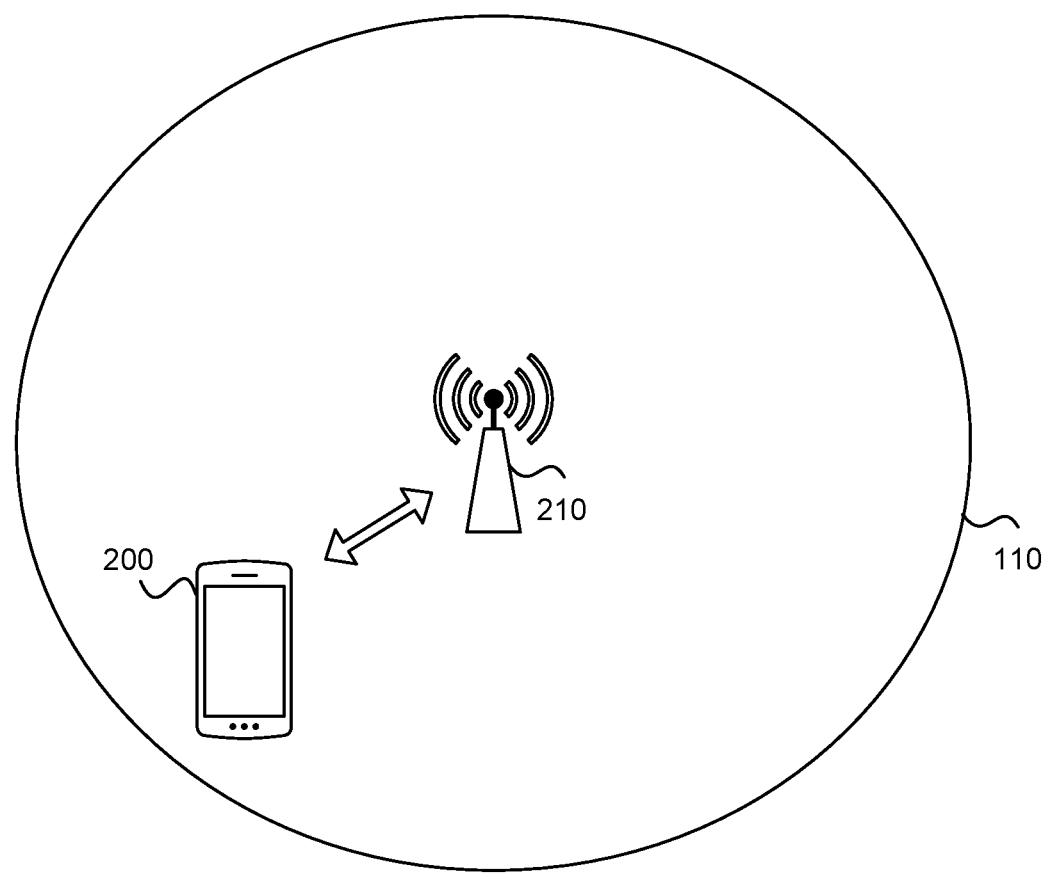
FIG. 1 shows an example embodiment of the subject matter described herein illustrating an example system, where various embodiments of the present disclosure may be implemented.
Figure 1:
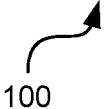

FIG. 1 illustrates an example system 100, where various embodiments of the present disclosure may be implemented. The system 100 may comprise a fifth generation (5G) new radio (NR) network 110. An example representation of the system 100 is shown depicting a client device 200 and a network node device 210. At least in some embodiments, the 5G NR network 110 may comprise one or more massive machine-to-machine (M2M) network(s), massive machine type communications (mMTC) network(s), internet of things (IoT) network(s), industrial internet-of-things (IIoT) network(s), enhanced mobile broadband (eMBB) network (s), ultra-reliable low-latency communication (URLLC) network(s), and/or the like. In other words, the 5G NR network 110 may be configured to serve diverse service types and/or use cases, and it may logically be seen as comprising one or more networks.

The client device 200 may include, e.g., a mobile phone, a smartphone, a tablet computer, a smart watch, or any hand-held, portable and/or wearable device. The client device 200 may also be referred to as a user equipment (UE). The network node device 210 may comprise a base station. The base station may include, e.g., a fifth-generation base station (gNB) or any such device suitable for providing an air interface for client devices to connect to a wireless network via wireless transmissions.

In 5G NR, modulated symbols and/or reference signals may be converted to an UL baseband signal waveform before mixing into an RF domain and transmitting over an air interface.

In 5G NR, two UL baseband signal waveforms have been specified, including:

cyclic prefix orthogonal frequency division multiplexing (CP-OFDM), which is applicable to both uplink and downlink, and discrete Fourier transform spread orthogonal frequency division multiplexing (DFT-s-OFDM), which is applicable to only uplink.

DFT-s-OFDM only supports a single transmission layer per user, whereas CP-OFDM can support more than one layer. This means that CP-OFDM may offer a higher throughput and capacity than DFT-s-OFDM. In contrast, DFT-s-OFDM has a lower peak-to-average power ratio (PAPR) than its counterpart, which may allow DFT-s-OFDM to be used with a higher transmit power, thereby offering better coverage.

DFT-s-OFDM may be generated by adding a transform precoding block before the processing blocks used for generating the CP-OFDM. The transform precoding block may comprise a fast Fourier transform (FFT) block that converts a time domain signal into a frequency domain signal. Due to the transform precoding block used in the transmitter, the waveform may be separately configured so that a receiver can perform an inverse operation (i.e., an inverse fast Fourier transform (IFFT)).

In 5G NR, frequency domain spectrum shaping (FDSS) with and without spectrum extension may be used.

Although the DFT-s-OFDM offers a lower PAPR compared to its CP-OFDM counterpart, 5G NR also supports a frequency domain spectrum shaping (FDSS) function, which may be used to further reduce the PAPR. With FDSS, a transmitted signal may be filtered to obtain a lower PAPR and/or a lower cubic metric (CM), which may entail a smaller maximum power reduction (MPR), and hence a higher maximum transmission power for coverage enhancement.

The FDSS may be applied for DFT-s-OFDM without a spectrum extension and used only with a pi/2-BPSK (binary phase-shift keying) modulation. Since the gain from applying the FDSS to higher order modulation techniques (e.g., quadrature phase-shift keying (QPSK)) may be lower than the gain when applying the FDSS to the pi/2-BPSK, and since improvements to the UL coverage are desirable, enhancements for other higher order modulation techniques may also be taken into account, including a symmetric spectrum extension function, which may be introduced before the FDSS in a processing chain. The idea is to extend the spectrum symmetrically by a factor of alpha using an excess band.

In 5G NR, tone reservation may also be used for PAPR reduction. With this technique, signals in a subset of available sub-carriers may be designed to cancel peaks in the (original) waveform and hence reduce the PAPR of the waveform. These subcarriers are referred to as peak reduction tones (PRTs).

In the following, various example embodiments will be discussed. At least some of these example embodiments described herein may allow dynamically indicating the switching of client device operation modes. For example, at least some of the example embodiments described herein may allow a signalling solution for indication of the switching from one client device operation mode to another.

At least some of the example embodiments described herein may allow such a signalling solution that allows for dynamic switching, that is, the signalling supports lower latency than switching via an RRC reconfiguration. In addition, the signalling solution may allow avoiding or at least minimizing impacts on DCI overhead and a scheduler of a gNB.

At least some of the example embodiments described herein may allow solving issues with DCI size misalignment when using DCI-based solutions for indicating the client device operation modes. That is, for a same DCI format, some DCI fields may be present or not depending on the RRC configuration. The DCI size (with or without these DCI fields) may then be fixed for all transmissions of the DCI format until the RRC is reconfigured. Specifically, a demodulation reference signal (DMRS) sequence initialization field in the DCI format 0_1 or format 0_2 may be present when the transform precoder is disabled (i.e., when the CP-OFDM is configured), and absent when the transform precoder is enabled (i.e., when the DFT-s-OFDM is configured). A DMRS sequence initialization field may be present or absent in the indicating DCI depending on the waveform to be switched to. This presence or absence of the field may be unknown to a client device in advance, which may lead to a misalignment of the DCI size, or the client device would need to apply two hypotheses on the DCI size for interpretation of every reception of the DCI, which would entail implementation costs.

At least some of the example embodiments described herein may allow different indications and/or interpretations of downlink control information in time domain.

Figure 2A:
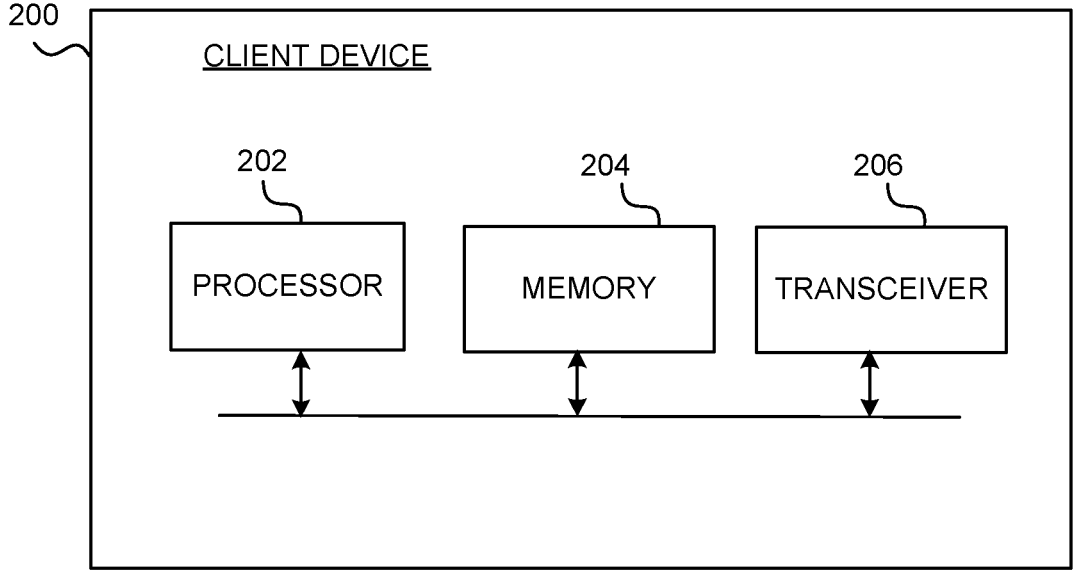
FIG. 2A shows an example embodiment of the subject matter described herein illustrating a client device.

FIG. 2A is a block diagram of the client device 200, in accordance with an example embodiment.

The client device 200 comprises one or more processors 202 and one or more memories 204 that comprise computer program code. The client device 200 may also include other elements, such as a transceiver 206 configured to enable the client device 200 to transmit and/or receive information to/from other devices, as well as other elements not shown in FIG. 2A. In one example, the client device 200 may use the transceiver 206 to transmit or receive signaling information and data in accordance with at least one cellular communication protocol. The transceiver 206 may be configured to provide at least one wireless radio connection, such as for example a 3GPP mobile broadband connection (e.g., 5G). The transceiver 206 may comprise, or be configured to be coupled to, at least one antenna to transmit and/or receive radio frequency signals.

Although the client device 200 is depicted to include only one processor 202, the client device 200 may include more processors. In an embodiment, the memory 204 is capable of storing instructions, such as an operating system and/or various applications. Furthermore, the memory 204 may include a storage that may be used to store, e.g., at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The client device 200 may comprise any of various types of devices used directly by an end user entity and capable of communication in a wireless network, such as user equipment (UE). Such devices include but are not limited to smartphones, tablet computers, smart watches, lap top computers, internet-of-things (IoT) devices, massive machine-to-machine (M2M) devices, massive machine type communications (mMTC) devices, industrial internet-of-things (IIoT) devices, enhanced mobile broadband (eMBB) devices, ultra-reliable low-latency communication (URLLC) devices, etc.

Figure 4:
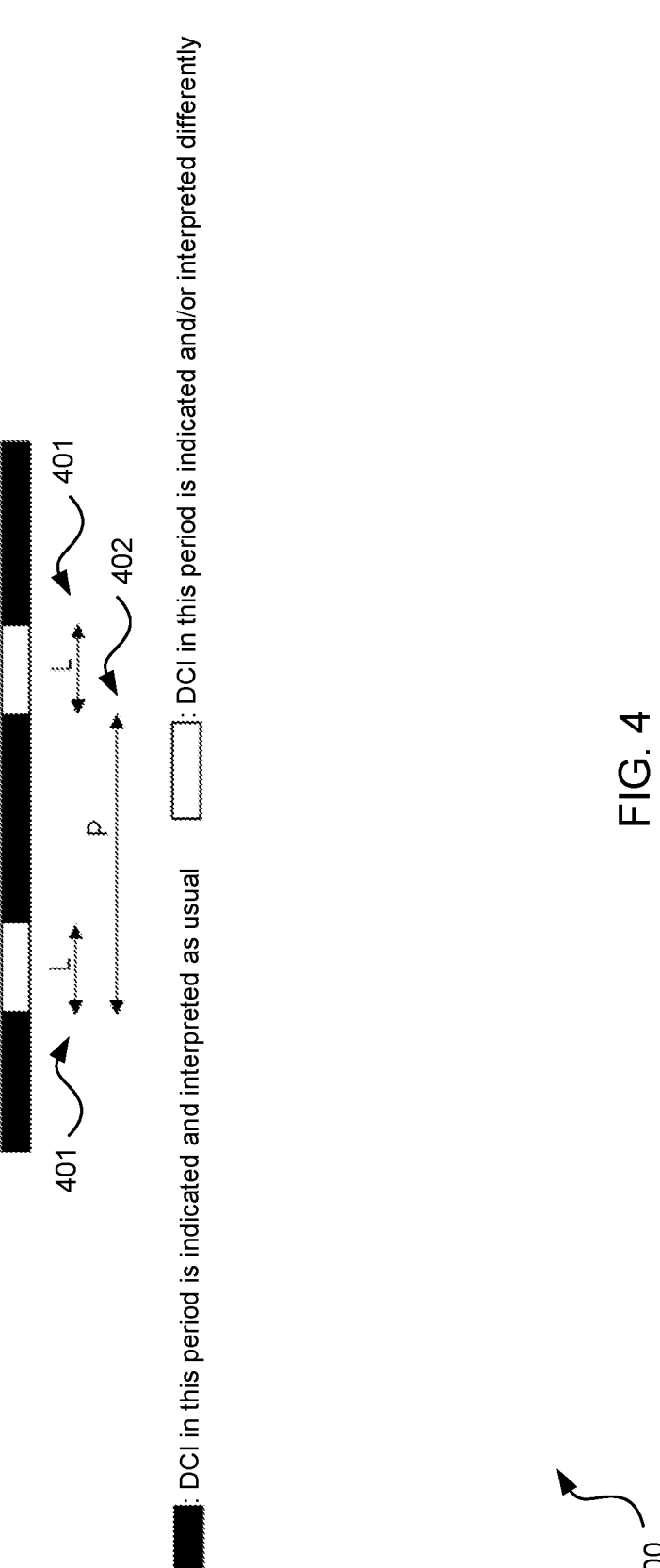
FIG. 4 shows an example embodiment of the subject matter described herein illustrating configuration of a time duration and a first period for repeating the time duration.

When executed by the at least one processor 202, instructions stored in the at least one memory 204 cause the client device 200 at least to perform obtaining a first indication indicating at least a time duration 401 and at least a first period 402 for repeating the time duration 401. Diagram 400 of FIG. 4 illustrates an example configuration of the time duration 401 and the first period 402 for repeating the time duration 401. For example, the time duration 401 may correspond to a set of orthogonal frequency-division multiplexing (OFDM) symbols spanning one or more time slots.

A downlink control information (DCI) received within the indicated time duration 401 includes a second indication indicating a second operation mode of the client device 200. The second indication is not included when the DCI is received outside of the indicated time duration 401.

At least in some embodiments, the instructions, when executed by the at least one processor 202, may further cause the client device 200 to perform the obtaining of the first indication by at least one of receiving the first indication via control signaling (e.g., RRC signaling), or deriving the first indication from one or more DCI monitoring occasions configured by the network node device 210.

In other words, the network node device 210 may indicate/transmit the first indication and the client device 200 may then receive the first indication. Alternatively, the first indication may be implicitly derived by the client device 200 via the network node device 210 configuring a subset of DCI monitoring occasions that may be used for waveform switching.

At least in some embodiments, the first indication may further indicate a second period for repeating the time duration 401. For example, the second period may be used when a second operation mode of the client device 200 is indicated and used, and otherwise the first period 402 may be used.

In other words, the network node device 210 may indicate and the client device 200 may receive (e.g., via RRC) configurations of the time duration 401 and two values of the period (e.g., a first value and a second value) for repeating the time duration 401. The second value of the period may be used, e.g., when the switching of the operation mode of the client device 200 to the second operation mode is triggered, and otherwise the first value of the period may be used. For example, the network node device 210 may indicate and the client device 200 may receive (e.g., via RRC) an association between the second operation mode and the second value for repeating the time duration 401.

For example, the second operation mode of the client device 200 may comprise a second waveform of an uplink baseband signal.

For example, the operation modes of the client device 200 may comprise, e.g., any of the following:
  FDSS DFT-s-OFDM with and without spectrum extension,
  FDSS DFT-s-OFDM with spectrum extension and with tone reservation,
  FDSS DFT-s-OFDM without spectrum extension and with tone reservation,
  DFT-s-OFDM with and without tone reservation,
  CP-OFDM with and without tone reservation,
  DFT-s-OFDM and CP-OFDM waveforms, and
  any combination of DFT-s-OFDM and CP-OFDM with or without any additional PAPR reduction techniques.

At least in some embodiments, the second period may be shorter than the first period 402.

In other words, the first value of the period may be longer than the second value of the period, such that after the client device 200 switches to the second operation mode of the client device 200, the shorter second value of the period may create more occasions (appearances of the duration 401) for the network node device 210 to indicate the switching back to the first operation mode of the client device 200.

At least in some embodiments, the first indication may further indicate an expiration time that starts when the switching of the operation mode of the client device 200 is triggered and at the expiry of which the client device 200 is to apply a first operation mode of the client device 200 after applying the second operation mode of the client device 200.

In other words, the network node device 210 may indicate and the client device 200 may receive (e.g., via RRC) configurations of the expiration time, wherein after switching to a second operation mode of the client device 200, the client device 200 may switch back to the first operation mode of the client device 200 when the expiration time expires. This may be advantageous, e.g., in a case of a dynamically varying environment in which the client device 200 may not be in one situation (e.g., coverage shortage) for a long time. At least in some situations, a duration 401 within the expiration time may be ignored.

In response to receiving the DCI from a network node device 210 within the indicated time duration 401, the instructions, when executed by the at least one processor 202, further cause the client device 200 at least to perform determining the second operation mode of the client device 200 based on the received second indication, and applying the determined second operation mode of the client device 200. For example, the determined second operation mode of the client device 200 may be applied to a next (or subsequent or future) uplink transmission. At least in some embodiments, the determined second operation mode of the client device 200 may be applied starting from a future uplink transmission or a future downlink reception. For example, the future uplink transmission may comprise at least one of a subsequent uplink transmission or a determined uplink transmission. For example, the future downlink reception may comprise at least one of a subsequent downlink reception or a determined downlink reception. At least in some embodiments, the determined second operation mode of the client device 200 may be applied starting from a time after the reception of the second indication.

In other words, the network node device 210 may transmit and the client device 200 may receive a DCI within the duration 401 that may indicate the switching of the operation modes of the client device 200 (e.g., the waveform switching).

In other words, the client device 200 may determine the operation mode of the client device 200 based on the DCI received within the duration 401.

In other words, the client device 200 may apply the determined operation mode of the client device 200 for the next UL transmission (e.g., a new waveform).

At least in some embodiments, the second indication may be included in the DCI as an additional field that is only present when the DCI is received within the indicated time duration 401.

In other words, e.g., a new (and different) DCI format may be used within the duration 401 compared to the DCI format that is used outside the duration 401, wherein the new DCI format may contain an additional field/bit(s) which may be used for indicating the switching of the operation modes of the client device 200, and wherein the additional field/bit(s) is/are not contained in a DCI format received outside the duration 401. As discussed above, the client device 200 may determine the operation mode of the client device 200 based on the DCI received within the duration 401. In this embodiment, the determination may be based on the additional field/bit(s) in the DCI received within the duration 401 which is/are used for indicating the switching of the operation modes of the client device 200.

At least in some embodiments, the second indication may be included in the DCI as an existing field that the client device 200 is configured to interpret differently within the indicated time duration 401 than outside of the indicated time duration 401.

In other words, e.g., a same DCI format may be used within the duration 401 and outside the duration 401, such that the client device 200 may apply different interpretations of at least one DCI field in the DCI if the DCI is received within the duration 401 compared to the case when the DCI is received outside duration 401. In an example, the DCI fields for a channel state information reference signal (CSI-RS) or a sounding reference signal (SRS) triggering may be (re)-interpreted as the indication of switching between the operation modes of the client device 200, when the DCI is received within the duration 401. As discussed above, the client device 200 may determine the operation mode of the client device 200 based on the DCI received within the duration 401. In this embodiment, the determination may be based on the different interpretations of at least one DCI field in the DCI when the DCI is received within the duration 401 compared to the case when the DCI is received outside the duration 401.

At least in some embodiments, e.g., a same DCI format may be used within the duration 401 and outside the duration 401, such that the network node device 210 may only send the DCI within the duration 401 if it intends to toggle the switching of the operation modes of the client device 200. In other words, the client device 200 may interpret the reception of the DCI within the duration 401 as an implicit indication for toggling the switching of the operation modes of the client device 200. As discussed above, the client device 200 may determine the operation mode of the client device 200 based on the DCI received within the duration 401. In this embodiment, the determination may be based on the reception of the DCI within the duration 401.

At least in some embodiments, e.g., a same DCI format may be used within the duration 401 and outside the duration 401, such that the network node device 210 may only send the DCI in preconfigured physical uplink control channel (PDCCH) occasions within the duration 401 if it intends to toggle the switching of the operation modes of the client device 200. In other words, the client device 200 may interpret the reception of the DCI in the preconfigured PDCCH occasions within the duration 401 as an implicit indication for toggling the switching of the operation modes of the client device 200. As discussed above, the client device 200 may determine the operation mode of the client device 200 based on the DCI received within the duration 401. In this embodiment, the determination may be based on the reception of the DCI in the preconfigured PDCCH occasions within the duration 401.

At least in some embodiments, a portion of the DCI may be included within the indicated time duration 401 and not included outside of the indicated time duration 401.

In other words, e.g., same or different DCI formats may be used within the duration 401 and outside the duration 401, such that the DCI received within the duration 401 may contain at least one DCI field that is not present in the DCI format received outside the duration 401. An example of such a DCI field includes the DCI field unused by the second operation mode (e.g., waveform) of the client device 200 but used by the first operation mode (e.g., waveform) of the client device 200, and which exists in the DCI that indicates the switching of the operation modes of the client device 200 (i.e., the DCI within duration 401) in order to align the DCI size.

Figure 2B:
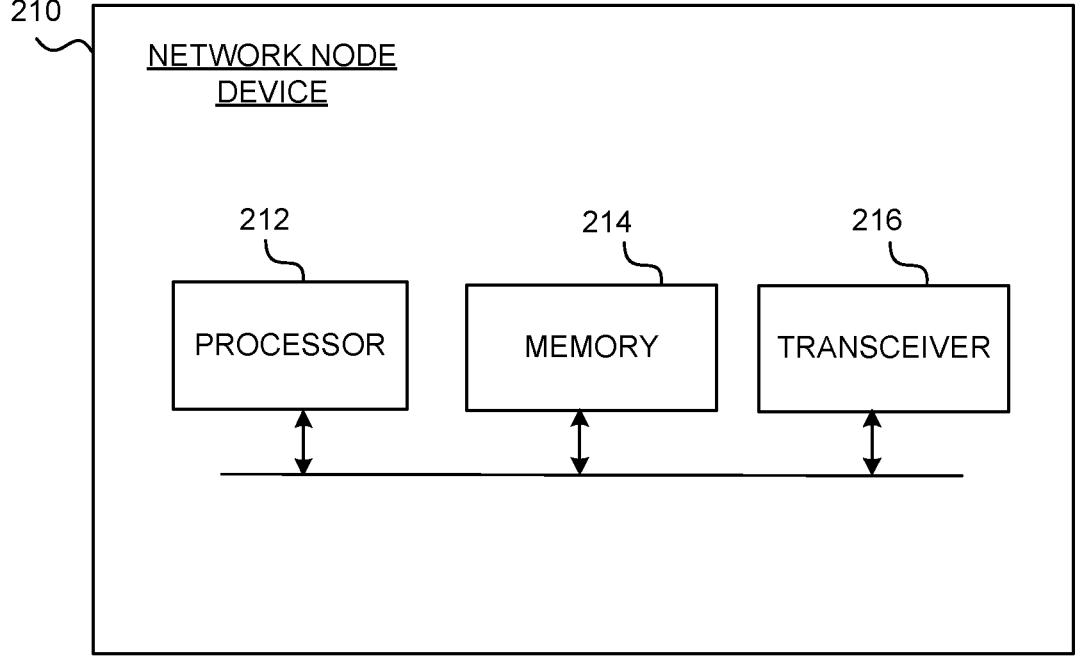
FIG. 2B shows an example embodiment of the subject matter described herein illustrating a network node device.

FIG. 2B is a block diagram of a network node device 210, in accordance with an example embodiment.

The network node device 210 comprises at least one processor 212 and at least one memory 214 including computer program code. The network node device 210 may also include other elements, such as a transceiver 216 configured to enable the network node device 210 to transmit and/or receive information to/from other devices, as well as other elements not shown in FIG. 2B. In one example, the network node device 210 may use the transceiver 216 to transmit or receive signaling information and data in accordance with at least one cellular communication protocol. The transceiver 216 may be configured to provide at least one wireless radio connection, such as for example a 3GPP mobile broadband connection (e.g., 5G). The transceiver 216 may comprise, or be configured to be coupled to, at least one antenna to transmit and/or receive radio frequency signals.

Although the network node device 210 is depicted to include only one processor 212, the network node device 210 may include more processors. In an embodiment, the memory 214 is capable of storing instructions, such as an operating system and/or various applications. Furthermore, the memory 214 may include a storage that may be used to store, e.g., at least some of the information and data used in the disclosed embodiments.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, or the like. In an embodiment, the processor 212 may be configured to execute hard-coded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and non-volatile memory devices. For example, the memory 214 may be embodied as semiconductor memories (such as mask ROM, PROM (programmable ROM), EPROM (erasable PROM), flash ROM, RAM (random access memory), etc.).

The network node device 210 may comprise a base station. The base station may include, e.g., a fifth-generation base station (gNB) or any such device providing an air interface for client devices to connect to the wireless network via wireless transmissions.

When executed by the at least one processor 212, instructions stored in the at least one memory 214 cause the network node device 210 at least to perform determining a second operation mode of a client device 200 to apply.

The instructions, when executed by the at least one processor 212, further cause the network node device 210 at least to perform providing to the client device 200 a first indication indicating at least a time duration 401 and at least a first period 402 for repeating the time duration 401. A downlink control information (DCI) transmitted within the indicated time duration 401 includes a second indication indicating the second operation mode of the client device 200, and the second indication is not included when the DCI is transmitted outside of the indicated time duration 401.

The instructions, when executed by the at least one processor 212, further cause the network node device 210 at least to perform transmitting the DCI to the client device 200 within the indicated time duration.

At least in some embodiments, the instructions, when executed by the at least one processor 212, may further cause the network node device 210 to perform the providing of the first indication to the client device 200 by at least one of transmitting the first indication to the client device 200 via control signaling, or configuring one or more DCI monitoring occasions.

Further features (such as those related to the first indication and the second indication) of the network node device 210 directly result from the functionalities and parameters of the client device 200 and thus are not repeated here.

Figure 3:
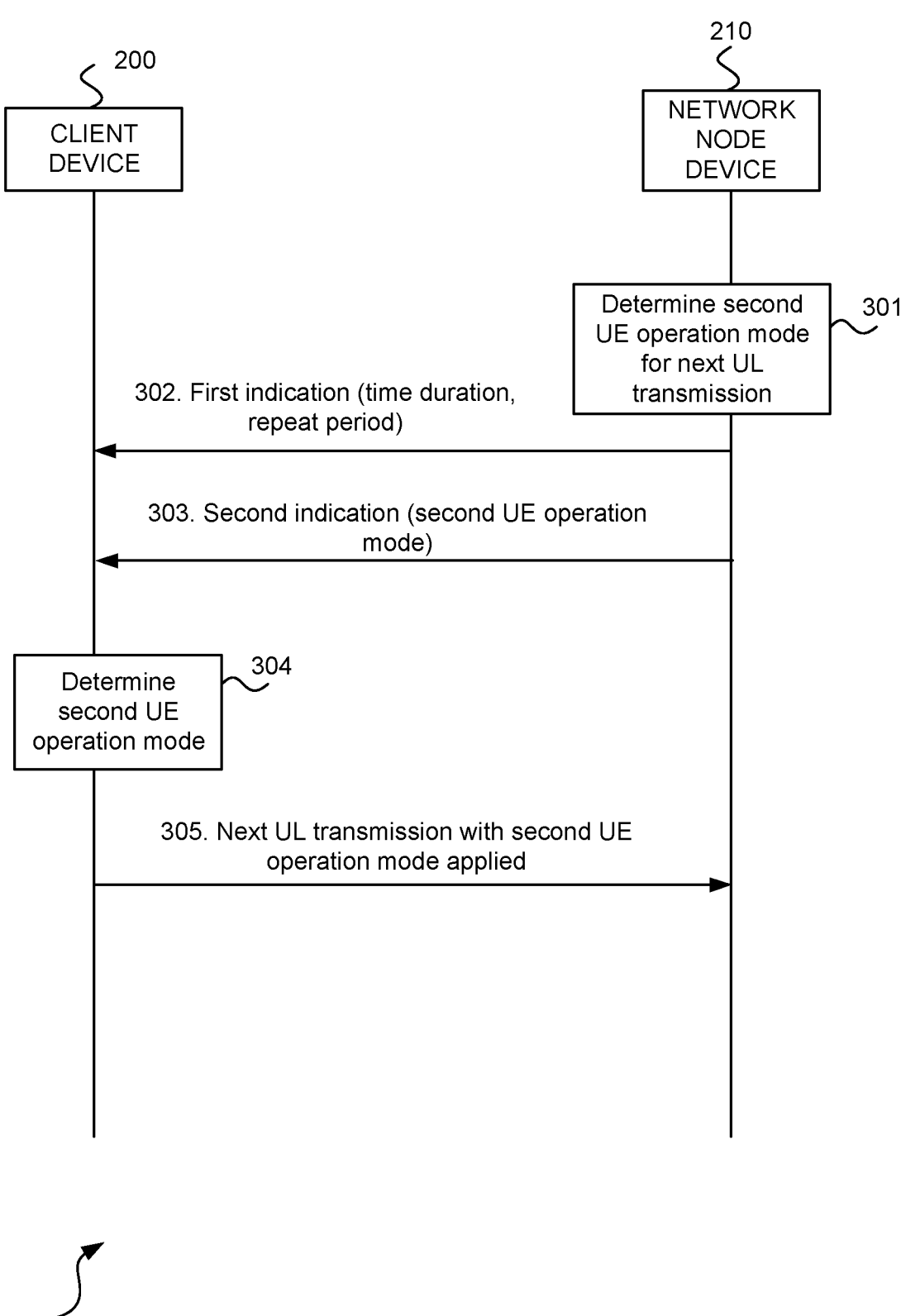
FIG. 3 shows an example embodiment of the subject matter described herein illustrating a method.

FIG. 3 illustrates an example signalling diagram 300 of a method, in accordance with an example embodiment.

At operation 301, the network node device 210 determines the second operation mode of the client device 200 to apply.

At operation 302, the network node device 210 provides to the client device 200 the first indication indicating at least the time duration 401 and at least the first period 402 for repeating the time duration 401. Further in operation 302, the client device 200 obtains the first indication. As discussed above in more detail, a downlink control information (DCI) transmitted within the indicated time duration 401 includes a second indication indicating the second operation mode of the client device 200, and the second indication is not included when the DCI is transmitted outside of the indicated time duration 401.

At operation 303, the network node device 210 transmits the DCI from the network node device 210 to the client device 200 within the indicated time duration 401. Further in operation 303, the client device 200 receives the second indication within the indicated time duration 401.

At operation 304, the client device 200 determines the second operation mode of the client device 200 based on the received second indication.

At operation 305, the client device 200 applies the determined second operation mode of the client device 200.

The method of diagram 300 may be performed by the client device 200 of FIG. 2A and the network node device 210 of FIG. 2B. The operation 301 can, for example, be performed by the at least one processor 212 and the at least one memory 214. The operations 304-305 can, for example, be performed by the at least one processor 202 and the at least one memory 204. The operations 302-303 can, for example, be performed by the at least one processor 202 and the at least one memory 204, as well as by the at least one processor 212 and the at least one memory 214. Further features of the method of diagram 300 directly result from the functionalities and parameters of the client device 200 and the network node device 210, and thus are not repeated here. The method of diagram 300 can be performed by computer program(s).

The client device 200 may comprise means for performing at least one method described herein. In one example, the means may comprise the at least one processor 202, and the at least one memory 204 storing instructions that, when executed by the at least one processor, cause the client device 200 to perform the method.

The network node device 210 may comprise means for performing at least one method described herein. In one example, the means may comprise the at least one processor 212, and the at least one memory 214 storing instructions that, when executed by the at least one processor, cause the network node device 210 to perform the method.

The functionality described herein can be performed, at least in part, by one or more computer program product components such as software components. According to an embodiment, the client device 200 and/or network node device 210 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A client device comprising:
at least one processor; and
at least one memory storing instructions that, when executed by the at least one processor, cause the client device at least to:
obtain a first indication indicating at least a time duration and at least a first period for repeating the time duration, wherein a downlink control information, DCI, received within the indicated time duration includes a second indication indicating a second operation mode of the client device, and wherein the second indication is not included when the DCI is received outside of the indicated time duration, wherein the first indication further indicates a second period for repeating the time duration, wherein the second period is shorter than the first period, wherein the first indication further indicates an expiration time at the expiry of which the client device is to apply a first operation mode of the client device after applying the second operation mode of the client device, wherein the second indication is included in the DCI as an additional field that is only present when the DCI is received within the indicated time duration, wherein the second period is used when the second operation mode of the client device is indicated, and otherwise the first period is used;

in response to receiving the DCI from a network node device within the indicated time duration:

determine the second operation mode of the client device based on the received second indication; and apply the determined second operation mode of the client device; and obtain the first indication by:

receiving the first indication via control signaling; and deriving the first indication from one or more DCI monitoring occasions configured by the network node device, wherein the operation modes of the client device comprises at least one of:

frequency domain spectrum shaping (FDSS) discrete Fourier transform spread orthogonal frequency division multiplexing (DFT-s-OFDM) with and without spectrum extension, FDSS DFT-s-OFDM with spectrum extension and with tone reservation, FDSS DFT-s-OFDM without spectrum extension and with tone reservation, DFT-s-OFDM with and without tone reservation, CP-OFDM with and without tone reservation, DFT-s-OFDM and CP-OFDM waveforms, or any combination of DFT-s-OFDM and cyclic prefix orthogonal frequency division multiplexing (CP-OFDM) with or without any additional PAPR reduction techniques.

\* \* \* \* \*